US00RE43668E

(19) United States
(12) Reissued Patent
Pogrebinsky

(10) Patent Number: US RE43,668 E
(45) Date of Reissued Patent: Sep. 18, 2012

(54) METHOD AND APPARATUS FOR TRANSMITTING PACKETS

(75) Inventor: Vladimir Pogrebinsky, Sammamish, WA (US)

(73) Assignee: Karo Millennium J.P., L.L.C., Wilmington, DE (US)

(21) Appl. No.: 12/324,483

(22) Filed: Nov. 26, 2008

Related U.S. Patent Documents

Reissue of:
(64) Patent No.: 7,142,506
Issued: Nov. 28, 2006
Appl. No.: 09/241,857
Filed: Feb. 2, 1999

(51) Int. Cl.
*H04J 1/16* (2006.01)
*H04J 3/14* (2006.01)
*H04J 3/16* (2006.01)
*H04J 3/22* (2006.01)
*H04L 12/28* (2006.01)

(52) U.S. Cl. ..... 370/229; 370/241; 370/356; 370/389; 370/465

(58) Field of Classification Search ..... None
See application file for complete search history.

(56) References Cited

U.S. PATENT DOCUMENTS 4,771,391 A * 9/1988 Blasbalg ..... 709/232
5,313,454 A * 5/1994 Bustini et al. ..... 370/231
5,359,593 A * 10/1994 Derby et al. ..... 370/234
5,490,168 A 2/1996 Shaffer et al.
5,491,513 A * 2/1996 Wickstrom et al. ..... 375/240.25
5,809,110 A * 9/1998 Ulrich et al. ..... 379/30
6,141,448 A 10/2000 Khansari et al.
6,269,078 B1 7/2001 Lakshman et al.
6,298,055 B1 10/2001 Wildfeuer
6,356,545 B1 3/2002 Vargo et al.
6,370,163 B1 * 4/2002 Shaffer et al. ..... 370/519
6,920,150 B1 7/2005 Pauls et al.

OTHER PUBLICATIONS

Office Action, mailed Feb. 27, 2003, for U.S. Appl. No. 09/241,857, 5 pages.
Office Action, mailed Sep. 10, 2003, for U.S. Appl. No. 09/241,857, 5 pages.
Office Action, mailed Feb. 17, 2005, for U.S. Appl. No. 09/241,857, 5 pages.
Office Action, mailed Aug. 16, 2005, for U.S. Appl. No. 09/241,857, 10 pages.
Final Office Action, mailed Mar. 14, 2006, for U.S. Appl. No. 09/241,857, 10 pages.
Schulzrinne et al., RTP: A Transport Protocol for Real-Time Applications, Network Working Group, Standards Track RFC 1889, Jan. 1996 at www.ietf.org/rfc/rfc1889.txt.
Perkins et al., RTP Payload for Redundant Audio Data, Network Working Group, Standards Track RFC 2198, Sep. 1997 at www.ietf.org/rfc/rfc2189.txt.

* cited by examiner

*Primary Examiner* — Melanie Jagannathan
(74) *Attorney, Agent, or Firm* — Schwabe, Williamson & Wyatt, P.C.

(57) ABSTRACT

There is disclosed an apparatus and methods for adjusting of bit rate transmission in a communication network by monitoring the state of the network, detecting the state of the network and transmitting a multimedia call over the network in accordance with the network state detected. In accordance with the invention the network state is monitored with the bit rate adjusted in accordance with the network state detected. This results in a multimedia call with greatly improved audio quality.

22 Claims, 5 Drawing Sheets

| G.723 | FRF | Redund | Regular | Loss | Delay | Loss+D |
|---|---|---|---|---|---|---|
| 9467 | 4 | 0 | NS | | S | |
| 10469 | 3 | 0 | NS | NS | S | NS |
| 12533 | 2 | 0 | S | NS | | NS |
| 18667 | 1 | 0 | H | | | |
| 17333 | 3 | 1 | | S | | S |
| 19600 | 2 | 1 | | S | | S |
| 26400 | 1 | 1 | | H | | H |

Frames in Packet

| | 1 | 2 | 3 | 4 | 5 | 6 |
|---|---|---|---|---|---|---|
| Bit Rate | 18667 | 12533 | 10469 | 9466.7 | 8853.3 | 8444.4 |
| | 26400 | 19600 | 17333 | 16200 | 15520 | 15067 |

without redundancy (RFC 1889) (Line 261 – Fig. 6)
with redundancy (RFC2198) (Line 260 – Fig. 6)

METHOD AND APPARATUS FOR TRANSMITTING PACKETS

Matter enclosed in heavy brackets [ ] appears in the original patent but forms no part of this reissue specification; matter printed in italics indicates the additions made by reissue.

FIELD OF THE INVENTION

The present invention relates to methods and apparatus for transmitting multimedia in a communication network. More particularly, the present invention relates to methods and apparatus for transmitting data packets containing audio and video, over a communication network, for example the Internet.

BACKGROUND OF THE INVENTION

Communication networks, such as wide area networks (WAN), are commonly known, and perhaps the fastest growing of these is the Internet. One Internet application, known as multimedia transceiver, enables users to transmit and receive audio, video and text over the Internet. An example of this application, known as Internet telephony client, allows for telephone calls over the Internet.

In accordance with this Internet telephony client, a user dials the telephone number of a recipient user via a computer keyboard or the like. When the call is established between the users, the Internet telephony client digitally samples the voice of one user, temporary stores the samples in a buffer, and packages the samples into a data packet or packets. The data packet or packets is/are transmitted to a recipient user using an IP protocol. The recipient user receives the data packet or packets, strips them of the protocol headers and converts the samples into voice. This method is also performed at the caller end of the internet connection pathway.

This Internet telephony client exhibits drawbacks in that the voice quality on both ends of the communication pathway is poor. Several methods have been attempted to improve this voice quality.

At the sender end, these methods typically involve always transmitting packets that are built based on the parameters that are necessary for insuring the audio quality at the receiving side. These parameters can be redundancy, packaging schemes and/or patterns and compression type and/or rate. These methods exhibited drawbacks in that they did not adjust for changing network conditions, whereby increases in the network load continued to result in poor audio quality.

Moreover, when video communications were added to these already poor quality audio communications, the network load increased. This increase resulted in further delay noise and disturbance in audio, lowering its quality, and freezing of the video image.

SUMMARY OF THE INVENTION

The present invention overcomes the disadvantages of the prior art by accounting for the network conditions and transmitting audio, typically voice, in accordance with the sensed network condition. Specifically, the present invention allows for the detection of the network state and controlling of the bit rate transmission of a communication, in order to improve the media quality of recipient, for example, a multimedia call, in accordance with the detected network state such that the audio quality of the communication is improved when compared to that of the prior art.

In one aspect of the present invention, there is provided a method for transmitting packets over a packed switch network. The network includes a plurality of multimedia transceivers for sending and receiving multimedia communications such as audio and video, typically voice.

The method includes the steps of providing at least two predefined network states to be compared with a monitored network state, monitoring the network state, selecting one state of the at least two predefined network states in accordance with the monitored network state, sampling at least one type of media at a transmitter for providing at least one media sample, packaging network protocol parameters with the at least one media sample into a packet, and transmitting the packet over the network, wherein the number of media samples in the packet is in accordance with the predefined network state.

Advantageously, a different type of packaging enables transmission of different lengths of packets with accordance to the network state. This allows for a bit rate adjustment according to the network available band width and state (condition), for improving received media quality at the receiver.

In the preferred embodiment of the invention, the steps of providing at least two predefined states further includes the steps of analyzing the network in accordance with at least one type of received media communication, categorizing the network into at least two network states, these network states corresponding to the above described predefined network states, and for each network state, packaging sat least one media frame with at least one parameter. In this manner, the parameters are parameters for improving an audio quality of the receiver.

The invention also provides an apparatus for transmitting packets over a packed switch network is provided. The apparatus includes a means for providing at least two predefined network states and at least one predefined media constructing parameter such as a table in a memory. The apparatus further includes a monitor for monitoring a network state, a selector for selecting at least one state of the at least two predefined network states in accordance with the monitored network state, a sampling means for providing samples of at least one media type, a packaging means for packaging communication protocol parameters with media samples for providing a packet, and a transmitter for transmitting the packet, that has been constructed in accordance with the detected network state.

BRIEF DESCRIPTION OF THE DRAWINGS

The present invention will be described with reference to the accompanying drawings, wherein like reference numerals and/or characters identity corresponding or like components. In the drawings.

DETAILED DESCRIPTION OF THE DRAWINGS

Figure 1:
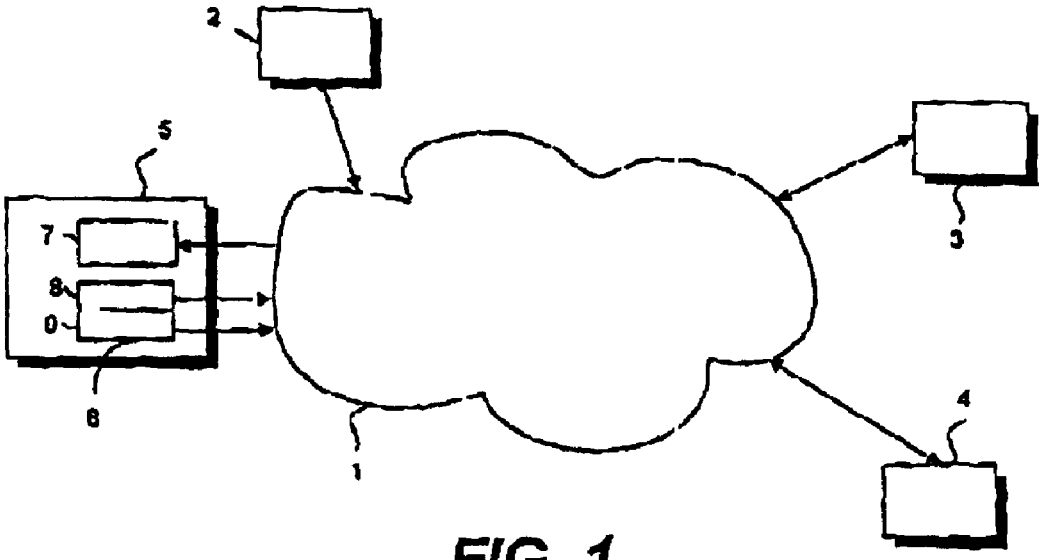
FIG. 1 is a block diagram of illustrating the present invention.

FIG. 1 details the present invention in operation with a packet switch network 1 for transmitting a data packet or packets. The packet switch network can be a wide area network and for example, it could be the Internet. Multimedia transceivers 2-5, for sending and receiving multimedia communications over the network 1, are linked to the network 1 by conventional communication means. These communications typically involve multimedia calls, that include audio and video, generated by a transceiver, such as transceiver 5 to another transceiver, such as transceiver 4 over the network 1.

Transceiver 5. Is exemplary of the other transceivers 2-4. All of these transceivers 2-5 typically include a transmitter 6 and a receiver 7. The transmitter 6 typically includes an audio transmitter 8 (in combination with an audio bit rate controller 19, as below, defines an audio channel), for transmitting audio packets over the network 1 and a video transmitter 9 (in combination with a video bit rate controller 20, as below, defines a video channel), for transmitting video packets over the network 1. The receiver 7 may include audio and video receivers (not shown) for receiving media transmissions that include audio and video. An example of such a transceiver is a computer program such as INTERNET PHONE® from Vocal Tec Communications, Ltd, Herzelia, Israel, that uses a PENTIUM® or PENTIUM II® based personal computers (PCs), that includes audio and video cards and a network communication device or a modem to perform the invention.

Figure 2:
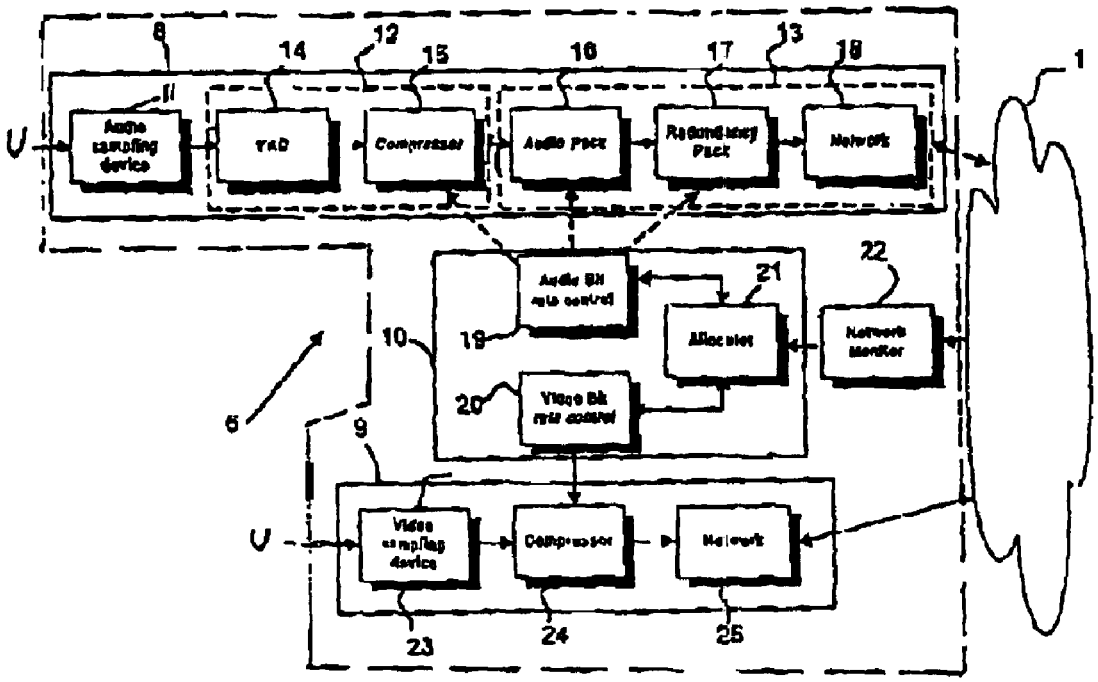
FIG. 2 is a detailed block diagram of a media transmitter in accordance with the present invention.

FIG. 2 shows a block diagram of the transmitter 6, as in communication with the network 1. The transmitter 6 includes the audio transmitter 8, video transmitter 9 and a selecting means or selector 10, for controlling bit rate between the audio 8 and video 9 transmitters, for transmission of packets (detailed below) over the network 1.

The audio transmitter 8 includes an audio sampling device 11, that samples the audio, such as voice from the user (U). This audio sampling device 11 is operably coupled with a compressing means 12, that communicates with a packaging means 13.

The compressing means 12 includes a voice activity detector (VAD) 14 and an audio compressor 16. The voice activity detector 14 detects voice activity and transfers the voice samples to the audio compressor 15. The audio compressor 15 functions to compress voice samples and to provide at least one audio frame.

The packaging means 13 includes audio packaging means 16, redundancy packaging means 17 and a Internet Protocol (IP) packaging means 18. The audio packaging means 16 serves to package compressed audio frames into a packet, while the redundancy packing means 17 is for packaging at least one redundant audio frame, corresponding to the packaged audio frame. The IP packaging means 18 packages IP communication protocol parameters, for example, an IP protocol header, for providing a packet and transmitting this packet over the network 1, typically the Internet, to the transceiver 4. This packaging is typically a packaging of audio frames in a single packet or multiple packets, as produced by the audio compressor 15 (and corresponding video compressor 24, for video). Packaging into single or multiple packets typically involves using one or more (but at least one) communication protocol parameters, such as a number of frames per packet, redundancy or a redundancy scheme, for input to the IP packaging means 18.

The video transmitter 9 includes a video sampling device 23, a video compressor 24 and packaging means 25. The video sampling device 23 samples the video signal and inputs the video samples to the video compressor 24. The video compressor 24 compresses the video samples and provides at least one video frame. The packaging means 25 package the video frame with the communication protocol headers, for example, IP protocol headers, to provide a packet or packets, that will be transmitted over the network 1.

The selecting means or selector 10 includes media bit data controllers, here, an audio bit rate control device 19 and a video bit rate control device 20 and an allocator 21. These media bit rate controllers control transmission speed and the network load in accordance with the monitored network state. The allocator 21 is operably coupled to a network monitor 22, that monitors the network 1, for its condition, in real time, by receiving the network state, and at least one of the media bit rate controllers. The network monitor 22 provides the network state to the selecting means 10. This in turn allows the selecting means 10 to control the video compressor 24 for packaging constructing parameters with video samples to provide best video quality at the transceiver 4. It also allows the allocator 21 in the selecting means 10 to select the monitored network state that is most similar to one predefined network state, from a series of network states, stored iii the allocator 21.

The allocator 21 may also include a data storage device (for storing databases, data, and the like), a data processor, such as a microprocessor or other computing or data processing means. Also the data storage device and data processor could be within the selecting means 10, external to the allocator 21, and could also be external to the transmitter 6. The audio bit rate control device 19 or video bit rate control device 20 receives commands (in the form of data or signals) from the allocator 21 to raise or lower the respective bit rates (detailed below). Additionally, the audio bit rate control device 19 and video bit rate control device 20 include hardware and software for adjusting the bit rate transmission to the available bandwidth of network 1.

A signal from the allocator 21 inputs control data to the audio bit rate controller 19. This audio bit rate controller 19 controls the audio compressor 15, audio packaging means 16 and the redundancy packaging means 17 of the audio transmitter 8, for packaging the parameters which result the best audio quality at the receiver 7 (FIG. 1).

Figure 3A:
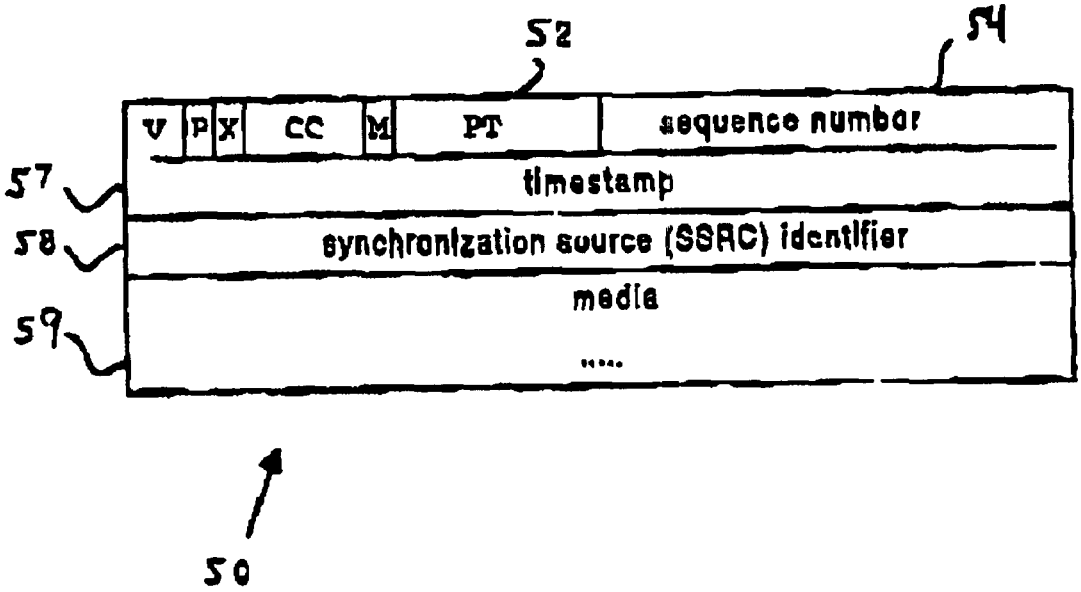
FIG. 3a is a diagram of a packet for a first protocol employed in the present invention.

FIG. 3a is a description of a packet 50 with accordance with a real time protocol (RTP), RFC 1889 as described in Schulzrinne, et al.; "RTP: A Transport Protocol for Real-Time Applications", Network Working Group, Standards Track RFC 1809, January 1996 (hereinafter, "Standards Track-RFC 1889"), available at http://www.ietf.org/rfc/rfc1889.txt, and incorporated by reference in its entirety herein. The packet 50 includes a plurality of fields of 32 bits.

The first five fields, Version field (V), Padding field (P), extension field (X), CSRC count field (CC) and the marker field (M) are described in Standards Track-RFC 1889.

A payload type (PT) field 52 identifies the format of the RTP media data and determines its interpretation by an application.

A sequence number field 54 increments by one for each RTP data packet sent, and may used by the receiver to detect packet loss to restore packet sequence, the sequence number field 54 is 16 bits field.

A timestamp field 57 includes 32 bits and reflects the time of the sampling instant of the first byte of the present packet. The sampling instant must be driven from a clock that increments monotonically and linearly in time to allow synchronization and jitter calculation of media samples.

A synchronization source identifier field 58 includes 32 bits and identifies the synchronization source.

The last field is a media field 59 which includes compressed media samples. The compressed media samples may be audio or video samples. In a preferred embodiment, a G.723 codec is used with a bit rate of 6400 bits per second. The audio samples are arranged in frames. Each frame includes 240 audio samples which are compressed into 24 bytes wherein each byte includes 8 bits. The number of media frames may be varied in accordance with the monitored network state.

Figure 3B:
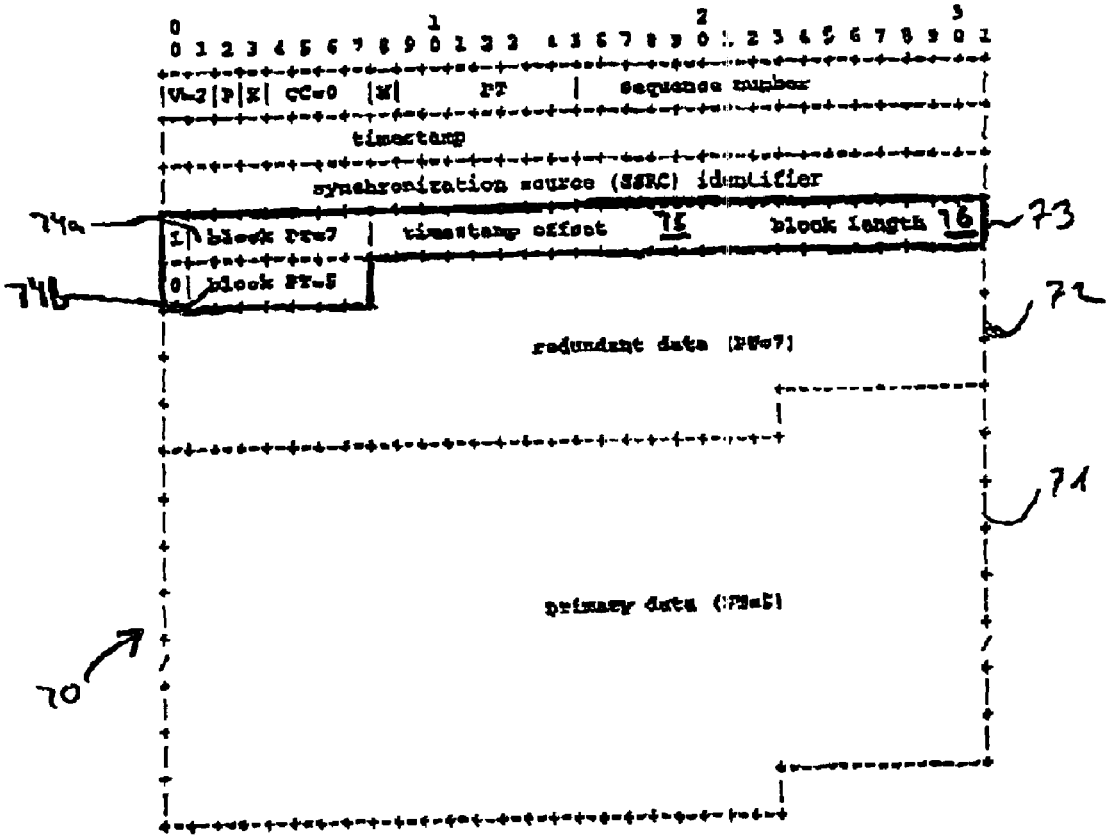
FIG. 3b is a diagram of a packet for a second protocol employed in the present invention.

FIG. 3b is a description of a packet 70 with accordance to a real time protocol (RTP), RFC 2198, as described in Perkins et al.; "RTP Payload for Redundant Audio Data", Network Working Group Standards Track RFC 2198, September 1997 (hereinafter, "Standards Track-RFC 2198"), available at http://www.letf.org/rfc/rfc2198.txt and incorporated by reference in its entirely herein. The packet 70 includes a plurality of fields of 32 bits, and is detailed at page 8 of Standards Track-RFC 2198.

The first five fields, Version field (V=2). Padding field (P), extension field (X), CSRC count field (CC=0), sequence number field, timestamp field and SSRC field and the marker field (M) are similar to those described for RFC 1889, in FIG. 3a above, and in Standards Track-RFC 1889.

The packets 70 containing a primary data block 71, and a single block of redundancy data 72 as defined in the Standards Track-RFC 2198 is illustrated.

The description of the other fields is as follows:

The bits in the header 73 (outlined in solid lines in FIG. 3b) are specified as follows:

The first bit in the header 73 indicates whether another header bock follows. If "1", further header blocks such as block PT=7 (block 74a) follow, if "0" this is the last header block, such as block PT=5 (block 74b).

Block "PT=7" (block 74a) is the RTP payload type which may be audio or video and which compressed in primary data block 71.

The next block in the header 73 is the timestamp offset block 75, this block relative to the timestamp given in RTP header, as described in FIG. 3a. The use of an unsigned offset implies that redundant date must be sent after the primary data, and is hence a time to be subtracted from the current timestamp to determine the timestamp of the data for which this block is the redundancy.

The next block is block length 76, which indicates length in bytes of the corresponding data block excluding header. The header for the primary (final) block comprises only a zero F bit, and the block payload type information PT-5 (block 74b). The final header is followed, immediately, by the data blocks, stored in the same order as the headers.

The choice of encodings used should reflect the bandwidth requirements of those encodings. It is expected that the redundant encoding shall use significantly less bandwidth that the primary encoding: the exception being the case where the primary is very low-bandwidth and has high processing requirement, in which case a copy of at least one audio or video frame, stored in the primary data block 71 may be used as the file redundant data 72.

The use of multiple levels of redundancy is rarely necessary. However, in those cases which require it, the bandwidth required by each level of redundancy is expected to be significantly less than that of the previous level.

Network behavior is analyzed statistically and is based on detected network behaviors. Network states are defined, where in each state, a set of constructing parameter for constructing the packet, needs to be determined.

Figures 4, 6, 7:
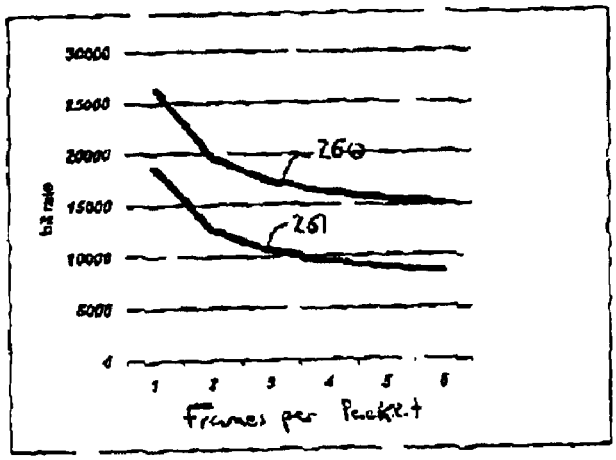
FIG. 4 is a table detailing audio packaging parameters in accordance with the network state.
FIG. 6 is a graph of bit rate versus frames per packet in accordance with the present invention.
FIG. 7 is a chart of actual bit ratios in accordance with the graph of FIG. 6.

Bit rate control is in accordance with the Table of FIG. 4. In this table, there are four predefined network states: Regular, Less, Delay, and Loss+D (Loss plus Delay), to which the actual detected network state is matched. Within each network state are bit rates for transmission, and corresponding quality states or quality degrees for the network state at the bit rate. These quality states (quality degrees) are defined as follows: H=high quality, the best quality state, transmitting one frame per packet and redundancy, wherein there is packet loss in the network; S=sufficient quality, the second best quality state (quality degree), transmitting more than one audio frame in a packet; and NS=non-sufficient quality, the least quality of the three quality states, packet loss without redundancy. This Table (FIG. 4) was obtained by analyzing the network in accordance with a received audio communication, characterizing the network into at least two states, and for each network state, packaging a number of media frames in accordance with the network state.

The apparatus and systems detailed above perform methods for transmitting packets in accordance with the present invention. These methods improve on the prior art transmitting methods, for they provide superior audio quality at the receiving side. An exemplary method, resulting in a transmission, such a multimedia call from transceiver 5 to transceiver 4 over the network 1 will be described now in accordance with FIG. 5.

Figure 5:
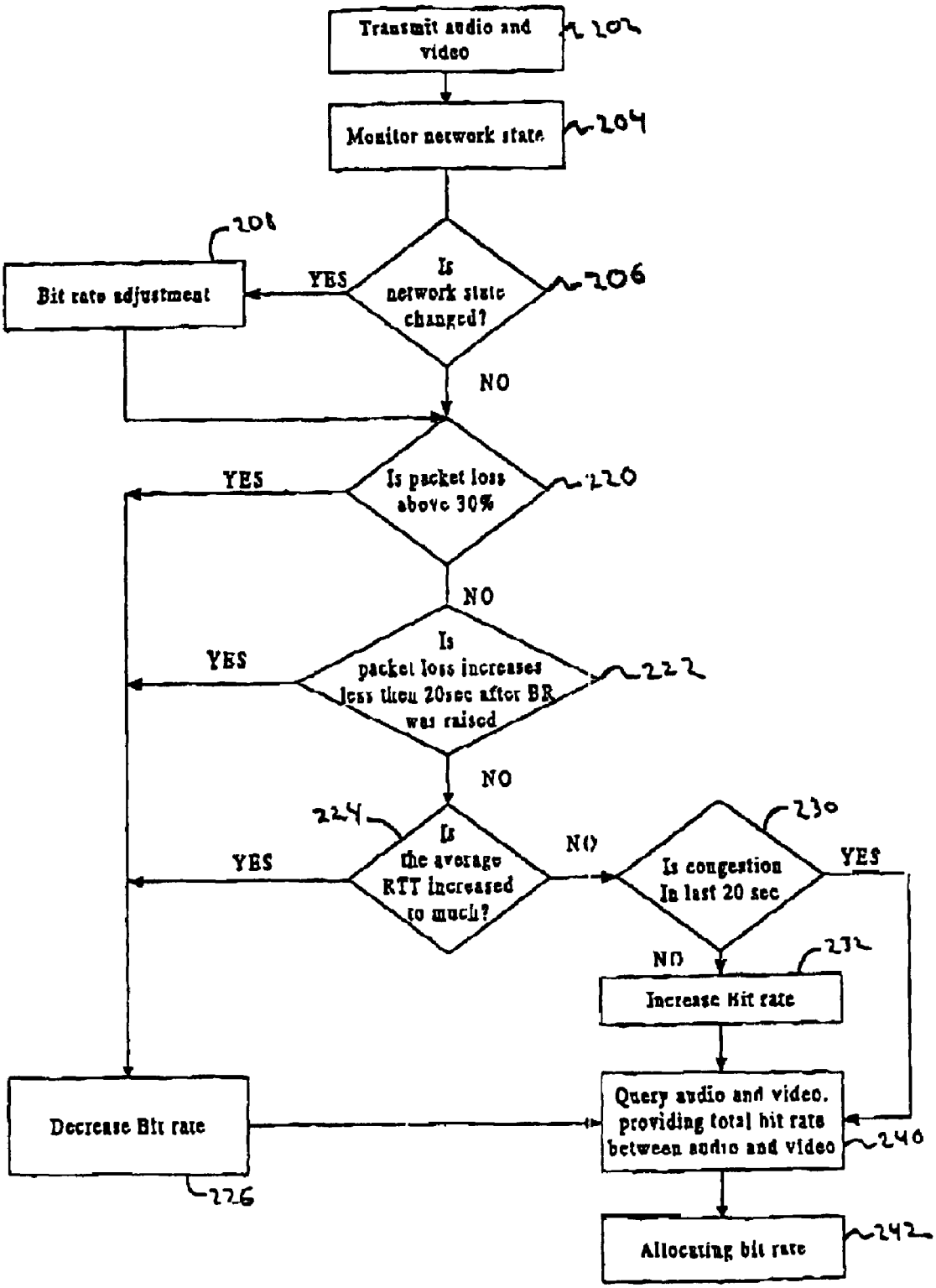
FIG. 5 is a flow chart of the method of the preferred embodiment of the invention.

In FIG. 5, there is shown the method of the present invention. The method may be performed for example, to include stages of bit rate adjustment in accordance with the network state. A first stage is a first or coarse adjustment of the bit rate, while the second stage is a second or fine adjustment of the bit rate. This two stage bit rate adjustment, for example, is performed by algorithms.

A first algorithm is employed to detect the network state and perform a first or coarse adjustment of the bit rate in correspondence thereto. A second algorithm serves to cause a second or fine bit rate adjustment, to increase or decrease bit rate upon detection of congestion in the network. 1. The bit rate, having been subject to a first (coarse) adjustment, and a second (fine) adjustment, if necessary, is then allocated among the audio and video channels by the allocator 21, such that the audio transmission is made with a proper bit rate allocated thereto in the preferred embodiment. It is preferred that this exemplary method be performed in intervals of 5 seconds.

At step 202, the interval is at a time during the transmission of audio and video. The first algorithm monitors the state of the network 1, at step 204, via the network monitor 22. At this time, the bit rate is an initial bit rate transmission, that is either a predetermined default rate, typically one set for a regular network state with sufficient quality audio, as in FIG. 4 in the Table, a bit rate of 12533 bits per second, corresponding to a network state of "Regular", with a quality state (quality degree) of "S" denoting sufficient audio quality, or the bit rate of the previous transmission (the most recent interval).

This network state monitoring may be with an RTCP Protocol. In accordance with that detailed in Standards Track-RFC 1889, that is part of an H.323 protocol. As part of the protocol, a test packet may be transmitted over the network 1, for example from transceiver 5 to transceiver 4, and back to the transceiver 5, to measure parameters, such as packet loss and round trip time (RTT) also known as round trip delay, the time it takes for a packet to travel from the sending transceiver through the network and back to the sending transceiver. Packet loss and RTT are detailed in Standards Track-RFC 1889.

The monitoring is such that the network monitor 22 includes software and hardware for executing an algorithm able to detect at least two different network states. This monitoring is preferably continuous or at regular intervals, typically at time lengths of 5 seconds.

Once the network state is detected (upon monitoring), the network monitor 22 sends data corresponding to the network state to the allocator 21, that activates data processing means in the allocator 21 or the body of the selecting means 10 that executes an algorithm for the audio, in accordance with the Table of FIG. 4, where a G.723 codec is used. This first algorithm is such that the network state, selected from four predetermined network states, is closest to title detected network state.

The network state is checked to see if it has changed, by the first algorithm, at step 206. The decision of network state change is done by detecting conditions at step 206, are detailed as follows:

1. If the measured packet loss is less than 3% and the present network state is "Loss" or "Loss plus Delay", the network state should be changed to either "Regular" or "Delay".

2. If the current network state is "Regular" or "Delay" and measured packet loss is greater then 5%, and network state should be changed to "Loss" or "Loss plus Delay".

3. If the current network state is "Regular" or "Loss" and the measured round trip time (RTT) is greater then 1000 ms, the network state should be changed to "Delay" or "Loss plus Delay".

4. When the current network state is "Delay" or "Loss plus Delay" and the measured RTT is less then 800 ms, the network state should be changed to "Regular" or "Loss".

If any of the above conditions have been detected, the network state has changed. The changed network state is matched to one of the four predetermined network states, and hit rate adjustment is made in accordance with the Table of FIG. 4, at step 208, for the predetermined network state, to which the detected network state most closely corresponds. In making this first adjustment, the network monitor 22 signals the allocator 21. In making this adjustment, the algorithm attempts to achieve a quality state (quality degree) of at least Sufficient Quality or "S". If the network state has not changed, this first bit rate adjustment is not made. This first algorithm is such that it attempts to achieve at least Sufficient Quality or "S" for the audio, so as to avoid changes of bit rate if possible.

Turning back to the table of FIG. 4, the quality states (quality degrees) are detailed. The "H" or High Quality state is a monitored transmission of a packet, that includes a single audio frame for packets via the IP communication protocol, for example, RFC 2198, if the transmission is made with redundancy, this redundant transmission includes at least one redundant packet over the network with packet loss. Similarly, the "S" or Sufficient Quality state is a monitored transmission of a packet, where 2-3 frames (audio) are packed into a packet via a protocol for redundancy (for example, RFC 2198), end redundancy is used when the network has packet loss. Other protocols, that help to overcome packet loss, such as forward error correction, are suitable for redundancy. Finally, the "NS" or Non-sufficient Quality state is a monitored transmission of a packet via a protocol, for example, RFC 1889, that does not include the transmission of redundant packets, but results in packet loss in the transmission.

Next, a second algorithm is employed to check (monitor) for network congestion level or delay. Congestion or delay is detected based on RTCP reports as sent from the network monitor 22 to the allocator 21. In this Algorithm, congestion is detected by analyzing three conditions, steps 220, 222 and 224. If any of these conditions exist, the algorithm is such that bit rate is decreased in a second or fine adjustment at step 226, by a signal to the allocator 21 from the network monitor 22. If a condition does not exist, this second algorithm moves to the next condition to see if it has been met. These conditions are as follows:

1. Is packet lose on RTT above 30% (step 220): if YES, the bit rate is decreased (step 226), it NO, the next condition (step 222) is analyzed;

2. Has packet loss increased, typically by a rise of at least 4%, less than 20 seconds after the bit rate was raised (step 222); if YES, the bit rate is decreased (step 226), if NO, the next condition (step 224) is analyzed; or 3. Has the average RTT increased more then 70 msecs in a short time, approximately 20 seconds (step 224); if YES, the bit rate is decreased (step 226), if NO, the next condition all three conditions do not exist and the algorithm continues.

When congestion in the network not detected, network congestion over the last 20 seconds is checked at stop 230. If it has not been detected, bit rate is increased, by a second or fine adjustment at step 232 in accordance with that detailed above.

Congestion may also be caused by lack of available bandwidth on the network, that serves to limit the bit rate. In this case, bit rate will be adjusted in the manner of the second or fine adjustment, to select a network quality state "S" or "NS", from "H" or "S" respectively, in accordance with the available network bandwidth. The network quality state is preferably adjusted to allow for transmission of at least two media streams, typically audio and video. By transmitting at these lower quality states, particularly "NS", transmission quality is being sacrificed in view of the available bandwidth.

If bit rate has been increased at step 232 or if congestion existed in the network over the last 20 seconds, the allocator 21, having been signaled to adjust bit rate, with both first (coarse) and/or second (fine) adjustments, the second algorithm is now complete and the first algorithm is resumed.

The continuation of this first algorithm is such that the audio and video bit rate controls 19, 20 respectively, are queried for the total bit rate between the audio and video channels, at step 240. During this step 240, at least one, and preferably both the audio and video channels, are sampled by the audio sampling device 2 and video sampling devise 23 respectively, in communication with their respective bit rate controllers 19, 20. The allocator 21 includes hardware and software that can detect the total bit rate by querying the bit rate in the audio and video bit rate controllers 19, 20 (as per the audio and video channels respectively) and combining the bit rates to find the total bit rate at step 240. Accordingly, the alocator 21 will know the quality of the audio transmission in accordance with the Table of FIG. 4. Also, in accordance with the Table of FIG. 4, the allocator 21 will know the total bit rate available, such that it can allocate bit rate between the audio and video bit rate controllers 19, 20, at step 242. In making the allocation, priority will always be given to the audio channel, such that the minimum bit rate for the audio is in accordance with the bit rates of the table FIG. 4.

With the bit rate now determined for the audio, and the video, if video is being transmitted as part of the multimedia call, a package can now be composed for transmission to transceiver 4. This package is constructed based on sending parameters, such as redundancy, of at least one frame with each redundant packet, indicated in the Table of FIG. 4 as "Redund" and the number of audio frames per packet, indicated in the Table of FIG. 4 as "FR#".

FIG. 6 shows a chart of hit rate versus frames (of audio) per packet for transmissions with a redundancy or 1 (line 260) and transmissions without redundancy (line 261). The chart of FIG. 7 details the actual bit rates for the transmissions with redundancy in accordance with line 260 and without redundancy in accordance with line 261. When a redundant packet is transmitted, the redundant packet is preferably transmitted at a different protocol than the corresponding packet. For example, when the packet is transmitted in a first protocol, typically the RFC 1889, the redundant packet will be transmitted in a different protocol, typically RFC 2198.

With the packets composed, the transmission is made. Monitoring continues for as long as desired, typically for the entire period of the transmission, with the above detailed method repeated (steps 204 to 242), over the course of the transmission. The repetition is typically in accordance with the monitoring periods for the network.

The entire apparatus disclosed above may be implimented on a data processor, such as a microprocessor (linked to a storage device). For example, client applications using these techniques may be implimented under WINDOWS™ OS in Pentium based Personal Computers (PCs) with sound and/or video cards for audio and video processing respectively.

While preferred embodiments of the present invention have been described so as to enable one of skill in the art to practice the present invention, the preceding description is exemplary only, and should not be used to limit the scope of the invention. The scope of the invention should be determined by the following claims.

What is claimed is:

1. A method for transmitting packets over a packet switch network which includes a plurality of multimedia transceivers for sending and receiving multimedia communications, the method comprising the steps of:

providing at least two predefined network [quality] states;

monitoring said network to detect at least one network [quality] state;

selecting one quality state [from the at least two predefined network quality states] in accordance with said detected network [quality] state;

creating at least one packet by placing at least one audio or video sample and at least one network protocol parameter into a package in accordance with said selected [network] quality state; and transmitting said packet over said network, wherein said [network] quality [states are] *state is* selected from the group consisting of:

not sufficient quality;

sufficient quality; and high quality.

2. The method of claim 1, wherein said not sufficient quality state is a monitored transmission of packets via a first protocol over said network which results in packet loss.

3. The method of claim 2, wherein said sufficient quality state is a monitored transmission of packet which includes at least two audio frames via a second protocol which includes at least one packet frame having at least one redundant frame over said network.

4. The method of claim 3, wherein said sufficient quality state is a monitored transmission of a packet which includes at least two audio frames via the first protocol over said network, which transmission result a packet loss.

5. The method of claim 1, wherein said high quality state is a monitored transmission of a packet which includes a single audio frame via the second protocol over said network, which transmission result a packet loss.

6. The method of claim 5, wherein said high quality state is a monitored transmission of a packet which includes a single audio frame, via said first protocol over said network.

7. The method of claim 1, wherein the step of selecting said quality state further includes the step of:

selecting [a network] *the* quality state in accordance with an available network bandwidth.

8. The method of claim 7, wherein the step of selecting comprises:

selecting a lower quality state from said presently selected quality state if available network bandwidth is decreased.

*9. A method comprising:*

*matching, by a transmitter, a network state of a network to a corresponding one of a plurality of predefined network states;*

*selecting, by the transmitter, a bit rate for a communication, the bit rate being a one of a plurality of bit rates having been previously determined to result in at least a sufficient communication quality level at the matching predefined network state, wherein the sufficient communication quality level is higher than a non-sufficient communication quality level, and lower than a high communication quality level; and*

*transmitting, by the transmitter, a plurality of packets of the communication according to the selected bit rate.*

*10. The method of claim 9, further comprising:*

*determining, by the transmitter, communication quality levels at one or more of the plurality of bit rates for each of the plurality of predefined network states of a network; and*

*categorizing, by the transmitter, each of the determined network communication quality levels as belonging to one of a plurality of predefined communication quality levels including at least the sufficient communication quality level, the non-sufficient communication quality level, and the high communication quality level.*

*11. The method of claim 9, further comprising:*

*matching, by a transmitter, another network state of the network to another corresponding one of the plurality of predefined network states, the other network state occurring at a second time later than a first time of the network state;*

*selecting, by the transmitter, another bit rate for the communication, the other bit rate being another one of the plurality of bit rates having been previously determined to result in at least the sufficient communication quality level at the other matching predefined network state; and*

*transmitting, by the transmitter, another plurality of packets of the communication according to the other selected bit rate.*

*12. The method of claim 9, wherein said transmitting the plurality of packets of the communication according to the selected bit rate comprises controlling a level of compression of at least one audio and/or video sample of the communication in accordance with the selected bit rate.*

*13. The method of claim 9, wherein said transmitting the plurality of packets of communication according to the selected bit rate comprises selecting a number of audio and/or video samples to be placed into each of the plurality of packets according to the selected bit rate.*

*14. The method of claim 9, further comprising monitoring, by a monitor, the network for congestion and delay, and adjusting, by the transmitter, the selected bit rate based at least on the network's congestion and/or delay.*

*15. The method of claim 9, wherein said transmitting the plurality of packets of communication according to the selected bit rate comprises selecting a packet length for the plurality of packets according to the selected bit rate.*

*16. A system comprising:*

*a network monitor to match a network state of a network to a corresponding one of a plurality of predefined network states;*

*a selector coupled to the network monitor to select a bit rate for a communication, the bit rate being a one of a plurality of bit rates having been previously determined to result in at least a sufficient communication quality level at the matching predefined network state, wherein the sufficient communication quality level is higher than an insufficient communication quality level, and lower than a high communication quality level; and*

*an audio and/or video transmitter coupled to the selector to transmit a plurality of packets of the communication according to the selected bit rate.*

*17. The system of claim 16, wherein the selector is further configured to:*

*determine communication quality levels for each of the plurality of bit rates at one or more of the plurality of predefined network states of the network; and*

*categorize each of the determined communication quality levels according to one of a plurality of predefined communication quality levels including at least the sufficient communication quality level, the insufficient communication quality level, and the high communication quality level.*

*18. The system of claim 16, wherein the selector is further configured to:*

*match a subsequent network state of the network to another corresponding one of the plurality of predefined network states; and*

*select another bit rate for the communication, the other bit rate being another one of the plurality of bit rates having been previously determined to result in at least the sufficient communication quality level at the other matching predefined network state; and*

*transmit another plurality of packets of the communication according to the selected other bit rate.*

*19. The system of claim 16, wherein the audio and/or video transmitter is configured to control a level of compression of at least one audio and/or video sample of the communication in accordance with the selected bit rate.*

*20. The system of claim 16, wherein the audio and/or video transmitter is configured to select a number of audio and/or video samples to be placed into each of the plurality of packets according to the selected bit rate.*

*21. The system of claim 16, wherein the network monitor is further configured to monitor the network for congestion and delay, and the selector is configured to adjust the selected bit rate based at least on the network's congestion and/or delay.*

*22. The system of claim 16, wherein the audio or video transmitter is configured to select a packet length for the plurality of packets according to the selected bit rate.*

* * * * *